United States Patent [19]
Alberts

[11] Patent Number: 5,967,165
[45] Date of Patent: Oct. 19, 1999

[54] METHOD AND APPARATUS FOR INCREASING VALVE FLOW EFFICIENCY

[75] Inventor: Jack B. Alberts, Houston, Tex.

[73] Assignee: Tyco Flow Control, Inc., Houston, Tex.

[21] Appl. No.: 08/994,370

[22] Filed: Dec. 19, 1997

[51] Int. Cl.[6] .................................................. F16K 47/08
[52] U.S. Cl. .............................. 137/1; 251/118; 251/127; 138/44
[58] Field of Search .................................... 251/118, 123, 251/127, 61, 61.2; 138/37, 39, 40, 42, 44; 137/599, 110, 1, 9

[56] References Cited

U.S. PATENT DOCUMENTS

| | | | |
|---|---|---|---|
| 2,651,323 | 9/1953 | D'Auriac | 251/118 |
| 3,481,365 | 12/1969 | Keen | 138/44 X |
| 4,705,065 | 11/1987 | McNeely et al. | |
| 5,134,855 | 8/1992 | Belcher et al. | 138/39 X |

OTHER PUBLICATIONS

A. Lichtarowicz and E. Markland: "Calculation of Potential Flow with Separation in a Right–angled Elbow with Unequal Branches." Dept. of Mechanical Engineering, University of Nottingham. May 1963.

S. Hayashi, T. Matsui, and T. Ito: "Study of Flow and Thrust in Nozzle–Flapper Valves." *Journal of Fluids Engineering*, Mar. 1975, pp. 39–50.

J. E. Jones: "Potential Flow from a Tapering Nozzle Impinging on a Flat Plate." *Journal of Fluids Engineering*, vol. 106, Mar. 1984, pp. 54–59.

*Primary Examiner*—Kevin Lee
*Attorney, Agent, or Firm*—Browning Bushman

[57] ABSTRACT

A valve body with a diverted flow passage extending between the inlet and the outlet is provided with a closure element that is mounted between the inlet and outlet and movable between first and second lift points for regulating fluid flow through the passage. A baffle disposed in the flow passage intermediate the first and second lift points alters one or more flow characteristics of the fluid to improve the efficiency of fluid flow through the valve. In a right angle body valve, the baffle takes the form of a plate with an aperture positioned concentrically with the inlet passage and the valve closure element. A top plane surface of the baffle plate is positioned below the centerline of the outlet and is perpendicular to the centerline of the inlet. The baffle separates turbulent areas of flow in the passage so that the pressure and flow of fluid exiting the valve are more uniformly distributed over the entire outlet. In modified forms of the invention, the baffle shape, position and aperture are matched with the flow constraining structure to produce optimum flow through the structure. The invention may be employed in any structure where intersecting flow paths meet such that the direction of fluid flow is changed between the structure's inlet and outlet.

24 Claims, 5 Drawing Sheets

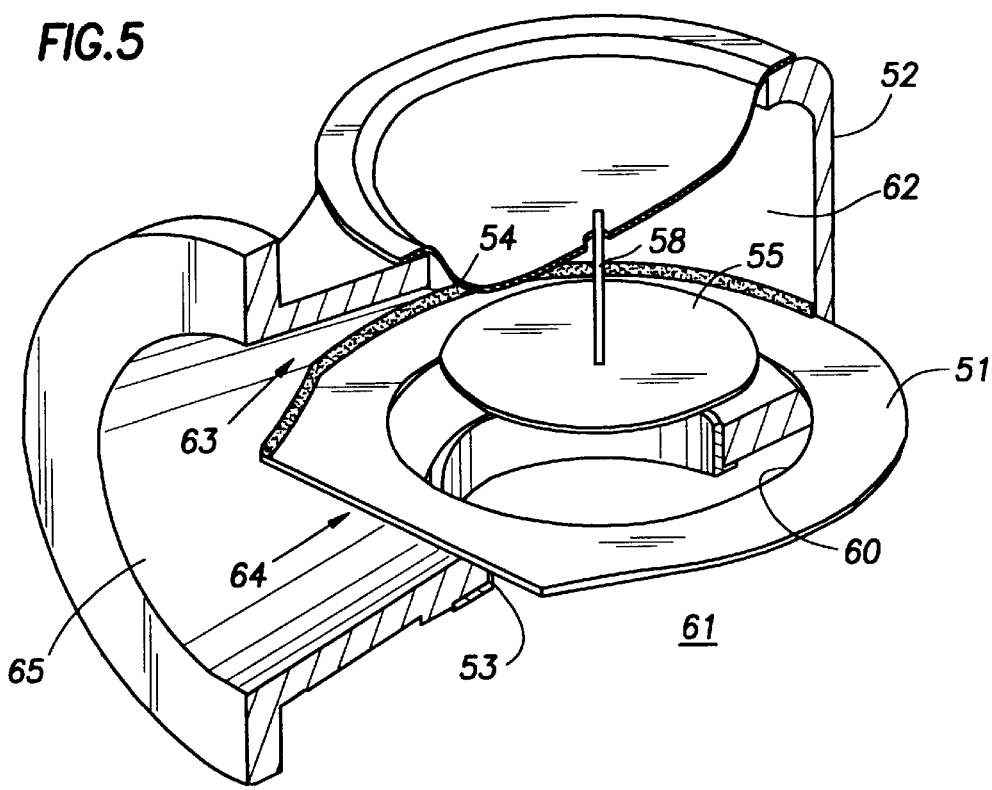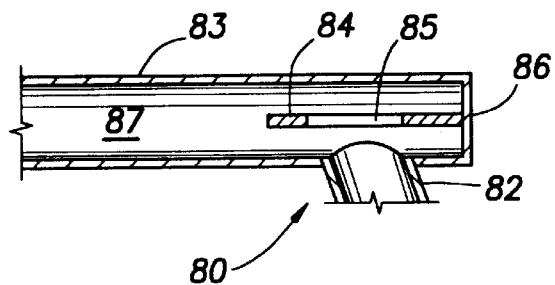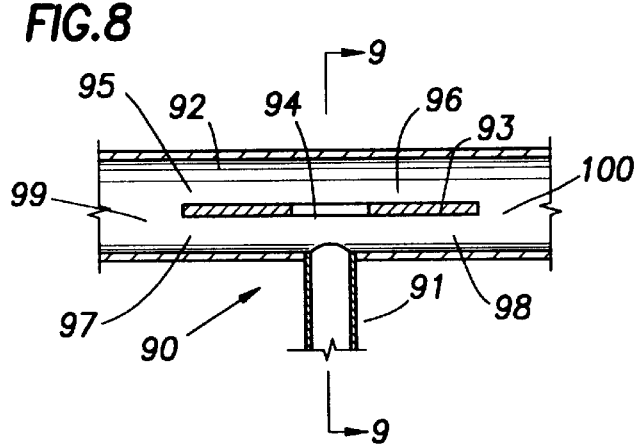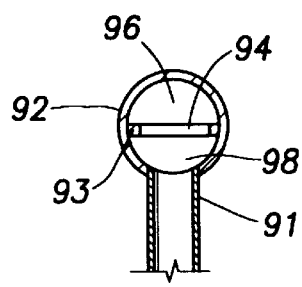

METHOD AND APPARATUS FOR INCREASING VALVE FLOW EFFICIENCY

BACKGROUND OF THE INVENTION

1. Field of the Invention

The present invention relates to fluid flow constraining devices that are used to direct or control the flow of liquids and gases. More specifically, the present invention relates to a method and apparatus for increasing the efficiency of fluid flow through a valve or other fluid flow constraining structure of the type in which the fluid flow direction is changed between the inlet and the outlet of the structure. In a specific application, the present invention is directed to right angle body valves flowing vapors or liquids in what is known as a subsonic flow condition.

2. Setting of the Invention

A right-angle body valve flowing vapors in a "subsonic" flow condition exhibits pressure at the plane of its discharge nozzle that is greater than approximately 50% of the pressure at the plane of its inlet nozzle. At discharge nozzle pressures below 50% of the inlet nozzle pressure, the discharge nozzle is operating in a "sonic" or "choked flow" condition in which the flow through the discharge nozzle is only affected by the inlet nozzle pressure and the physical design of the inlet nozzle.

The flow of liquids through a discharge nozzle is affected by the pressure at its discharge nozzle at all operating pressures. As a result, subsonic flow exits at all operating pressures of a right-angle body valve flowing liquids.

The evaluation of the efficiency of flow through a valve requires the evaluation of the valve's dimensions and component movements. The parameters evaluated in a right-angle body valve include the "lift," "lift ratio," "discharge coefficient" or "Kd" and "pressure ratio." These parameters may be best described with reference to FIGS. 1 and 2 illustrating a conventional right angle body valve 10.

The valve 10 is employed to convey pressurized fluid in a containment area indicated at 11 to a lower pressure outlet area indicated at 12. A circular valve seat plate or disc 13 positioned against a circular inlet nozzle seat top edge 14 prevents flow between the areas 11 and 12. The seat plate 13 is moved into and out of engagement with the nozzle edge 14 by vertical movement of a valve stem 15 connected to a conventional regulator control system indicated generally at 16. Only a portion of the regulator control system 16 is illustrated in FIGS. 1 and 2. Operation of the valve 10 is conventional with the pressure in the regulator control system 16 employed to regulate the opening and closing of the valve 10 by appropriately raising or lowering the valve plate 13. Fluid entering the open valve 10 flows through an inlet nozzle 17 and exits the valve through an outlet nozzle 18. The body of the valve and the components connected to the valve inlet and outlet form a constraining structure that alters the flow of the contained fluid between an inlet area 19 and the outlet area 12. In the case of a right-angle body valve such as the valve 10, the direction of flow is changed by approximately 90°.

With reference to FIG. 2, the "lift" of the valve 10 is the separating distance between the bottom face 13a of the valve plate and the nozzle seat top edge 14. The "lift ratio" for the valve 10 is the ratio of the lift to the diameter of the nozzle 17. The "discharge coefficient" or "Kd" is the ratio between the actual measured flow through the valve 10 verses the maximum theoretical flow of an ideal inlet nozzle with a bore area equal to that of the valve's inlet nozzle 17. The Kd may be measured at more than one lift ratio value. "Pressure ratio" is the ratio of the pressure at the valve's discharge point to the pressure at the valve's nozzle inlet.

It will be understood by reference to FIGS. 1 and 2 that the valve 10 and the associated pressure area 11 form a flow constraining structure that alters the direction of flow of fluid in the structure from an inlet 19 to the outlet 12.

Historically, conventional forward flow, right-angle closed body style valves operating in the subsonic flow region and at high pressure ratios have required high lifts to overcome low Kds and attain the maximum flow rates desired. For reference, typically, right angle valves flowing vapors in the sonic flow condition (pressure ratio below 0.50) will attain valve Kds in the range of 0.97 at lift ratios ranging from 25% to 45%. The same valve flowing vapors in the subsonic range will require lifts exceeding 65% to attain the same Kd value when operating at pressure ratios near the 0.50 transition point. The lift requirement increases to even higher required lifts in an environment of lower attainable Kd values as the flowing pressure ratios approach the 1.00 value.

Low subsonic Kds have been attributed to two primary factors. The first factor is an identified flow pattern that creates a flow restriction in the radial flow region between the face of the valve seat and the circumference of the valve nozzle. This restriction is created from the turning of the discharge flow that occurs when the flow stream from a nozzle strikes a generally flat surface that is perpendicular to the centerline of the nozzle and is located just beyond the discharge face of the nozzle. The second factor specifically related to right angle valves is the difficulty of obtaining a smooth aerodynamic gas flow and pressure reduction in the valve body cavity between the valve inlet nozzle and the discharge outlet.

In open discharge valve designs utilized, for example, for various low pressure relief valves for tanks, there is no surrounding valve body or conduit to constrain the exiting flow. The primary restriction on valve flow rate for this type valve is the radial nozzle flow constriction. As a result, for this style of valve, it is possible to attain essentially the maximum theoretical flow rate of the valve nozzle independent of all other factors except atmospheric back pressure by simply increasing the valve lift. Because of the open construction of these valves, any additional cost related to the solution of the problem of restricted flow is limited to that of the valve operator costs.

A high lift combined with a large valve body cavity in closed body valves can increase valve flow efficiency for many valve applications. Such a solution, however, requires a more costly operator and increased valve body dimensions with corresponding penalties in the valve body weight and cost.

The efficiency of the fluid flow through a closed body valve may be improved by shaping a downstream cavity in the valve in a way to minimize restrictions to the inlet flow. One such design is employed in the Anderson, Greenwood Series 9000 pilot operated safety relief valve. This valve includes a cavity downstream of the valve closure mechanism that has been dimensioned and contoured to minimize resistance to flow into the downstream section of the valve. As compared with a valve lacking such features, the efficiency of fluid transfer through the valve is substantially improved.

SUMMARY OF THE INVENTION

In closed body, right-angle valves, such as the valve 10, it has generally been believed that the horizontal radial flow expanding from the "curtain" area (created by the valve disc 13) and striking an adjacent valve cavity side or rear wall region is directed upwardly into an empty valve body volume 21 existing above the disc. It was thought that the flow was then directed toward the valve outlet 12 by virtue of the pressure differential created by radial flow in the valve body region below the valve disc level verses the flow in the body region above the disc level, which is exposed to the lower discharge pressure region in the valve.

It has been discovered, however, that within the radial flow region of a nozzle flowing against the base of an opposed flat plate there exist two distinctive radial flow regimes in the circumferential area between the valve nozzle edge and the face of the opposing valve disc. The region furthest from the inlet nozzle is referred to as the upper circumferential area and the region nearest the inlet nozzle is referred to as the lower circumferential area. The upper circumferential area, which is approximately 50% of the total circumferential area, is dominated by a high energy radial flow that accounts for approximately 65% of the total fluid flow volume. The lower circumferential area possesses a low energy radial gas expansion at a much lower radial velocity than the upper area. This lower regime accounts for approximately 35% of the total fluid flow volume.

It has been discovered with respect to right-angle valves that a significant flow interaction occurs between the upper radial nozzle flow pattern and the surrounding wall surfaces of an enclosed valve body. Very little of the high energy radial flow radiating from under a valve disc is redirected upwardly away from the inlet nozzle upon striking an adjacent valve wall. Instead, the great majority of this flow upon striking the wall is redirected downwardly along the side wall surface to the bottom surface of the valve body and subsequently inwardly along the bottom surface toward the valve nozzle's low energy discharging circumference flow region. The resulting effect is the creation of two counter-rotating vortex flows initiating at opposing sides of the valve body near the outlet nozzle centerline. This flow interaction impedes the fluid flow from the low energy region of the nozzle. Each flow spirals around its respective side of the valve inlet nozzle toward the valve outlet in the restricted boundaries formed by the valve nozzle circumference, the high velocity flow emanating from the disc face and the surrounding valve body wall. At the valve outlet, the flow of the inner vortex wall of one vortex mates with the flow of the inner vortex wall of the opposing vortex to exit the valve without either vortex flow expanding above the lower 40% to 50% of the valve's outlet bore. The remaining minimal percentage of the high energy radial flow radiating from under the disc face is directed upwardly upon striking the valve wall and acts to create a rotating toroid of gas flow between the upper surface of the valve seat disc and the upper valve body bottom surface. Very little of this flow is ultimately directed into and exhausted through the upper region of the valve outlet bore.

A general objective of this invention is to minimize the effects of these discovered vortices and their restriction of the lower nozzle flow area and to redirect the radial nozzle flow in a direction away from the inlet nozzle, upwardly to the upper region of the valve body.

A feature of this invention is that it achieves this objective in a manner that alters the valve body's basic internal pressure balance to a totally new and better organized flow pattern structure within all regions of the valve body.

A preferred embodiment of this invention in a right-angle, closed-body valve employs a baffle plate in the valve cavity. The baffle plate has a circular aperture that is concentric with, and slightly larger than, the circular valve inlet nozzle bore. The plane of the baffle plate is at a right angle to the central axis of the inlet nozzle and divides the outlet region of the valve into two volumetric regions above and below the baffle plate with the upper region having the larger volume. The baffle is placed below the centerline of the outlet nozzle at a height below the maximum lift height of the valve seat plate and at a position above the top edge level of the valve inlet nozzle discharge plane. The baffle extends across the valve cavity and is sealed at its contact edge with the surrounding valve body wall. The downstream edge of the baffle extends into the valve discharge throat bore.

The installation of the baffle configuration of this invention results in a totally revised flow regime within the valve body by providing a critical separation of the high energy upper nozzle flow and the low energy lower nozzle flow regions. The presence of the baffle alters the described nozzle flow/body wall interaction causing a change in the entire internal flow pattern within the valve body. The constraining vortices in the lower region of the valve outlet are substantially eliminated and the flow volume from the lower nozzle area is increased. The complex flow patterns previously present in the lower valve body region are replaced by a very linear flow directed under the baffle to the outlet of the valve. Coincidentally, the majority of the flow in the high energy upper nozzle flow region flows radially outwardly and upwardly above the upper surface of the installed baffle where it intersects the surrounding valve body wall and is directed into the valve cavity region above the valve seat plate. In this region, the toroidal flow pattern existing in the absence of the baffle is replaced by a linear gas flow directed across the top of the valve body cavity through the previously poorly utilize upper region of the valve's discharge throat.

A direct result of the described flow pattern alterations is an improved Kd verses lift ratio and Kd verses body cavity size efficiency of right angle valves flowing vapors in the subsonic flow pressure range. The same improvement occurs in such valves flowing liquids at all pressures.

Accordingly, from the forgoing it will be appreciated that a primary object of the present invention is to increase the efficiency of flow of fluids through a right-angle body valve.

A related object of the present invention is to increase the efficiency of fluid flow through a right-angle valve without increasing the size or weight of the valve body and without having to provide a specially contoured flow passage through the valve.

It is also an object of the present invention to provide a valve design that can be retrofitted to existing valve bodies for improving the efficiency of flow through the valve.

An important object of the present invention is to provide a valve body that is simple and inexpensive to fabricate but that has an improved efficiency of flow transmission through the body as compared with bodies of similar size and weight.

An object of the present invention is to decrease the size and weight of a valve while attaining improved efficiency of flow through the valve.

A general object of the present invention is to provide a downstream flow conditioning design that improves the efficiency of the flow through a fluid constraining structure.

An important object of the present invention is to provide a method for separating and redirecting the flow of fluids through a flow constraining structure to increase the efficiency of the fluid flow through the structure.

The forgoing features, advantages and objects of the present invention, as well as others, will be better understood and appreciated from the following specification, drawings and claims.

BRIEF DESCRIPTION OF THE DRAWINGS

FIG. 5 is a cut-away, isometric view of the valve of FIG. 3;

FIG. 7 is a vertical, cross-sectional view of a flow constraining assembly employing the flow efficiency improving feature of the present invention;

FIG. 8 is a vertical, cross-sectional view illustrating a modified form of the present invention employed at the intersection of two flow constraining structures;

FIG. 9 is a vertical section taken along the line 9—9 of FIG. 8 illustrating details in the placement of the baffle of the present invention;

DESCRIPTION OF THE ILLUSTRATED EMBODIMENTS

Figure 1:
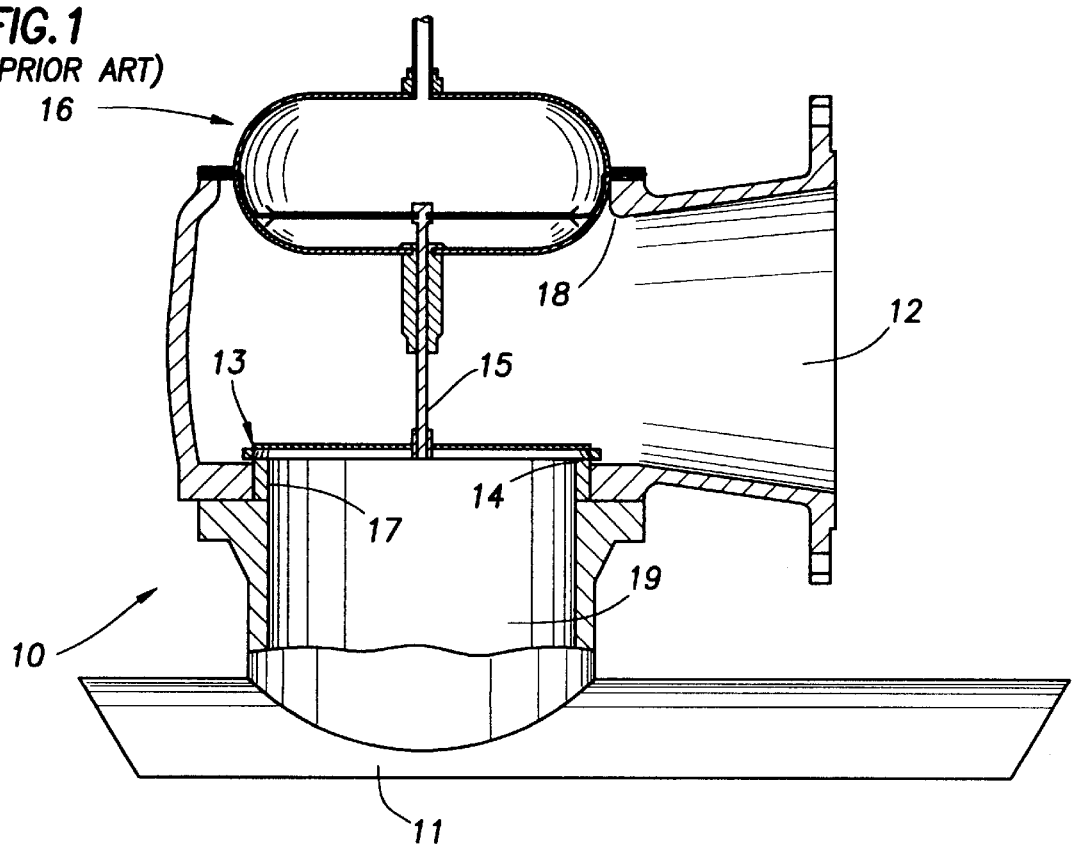
FIG. 1 is a vertical, cross-sectional view illustrating a prior art pressure control relief valve in closed position.
Figure 2:
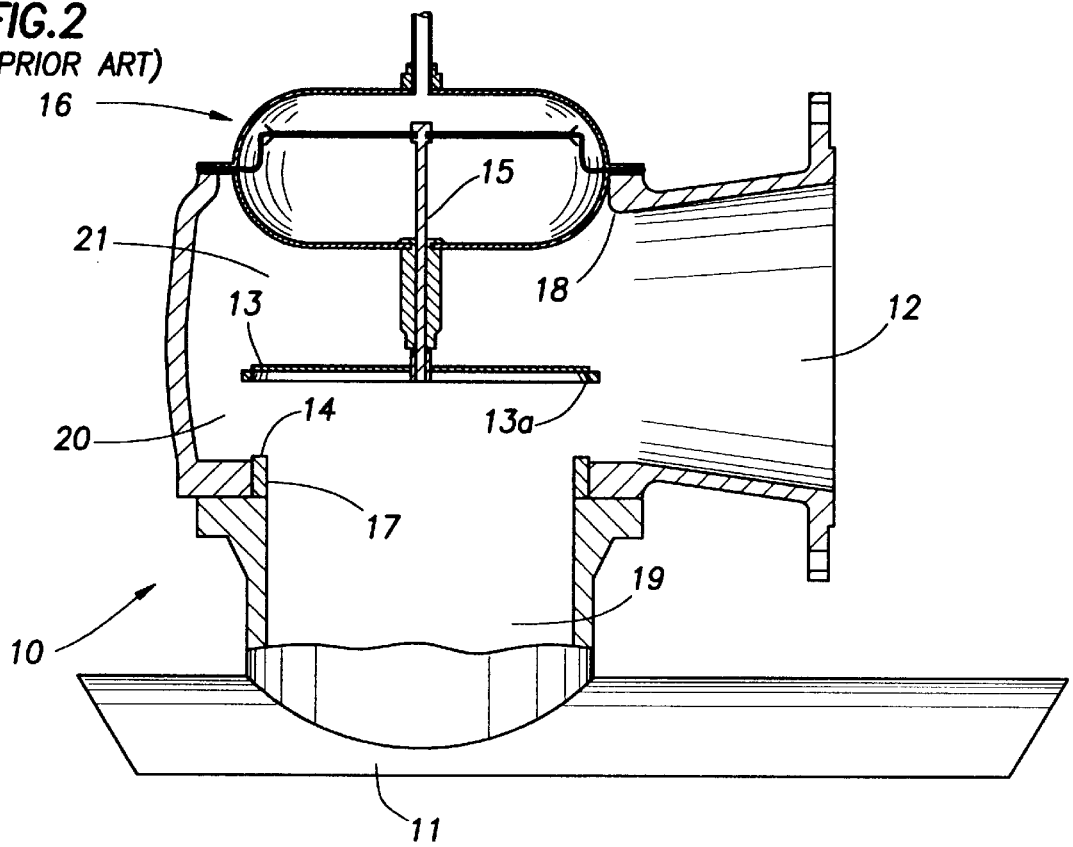
FIG. 2 is a view similar to FIG. 1 illustrating the relief valve in its open condition.
Figure 3:
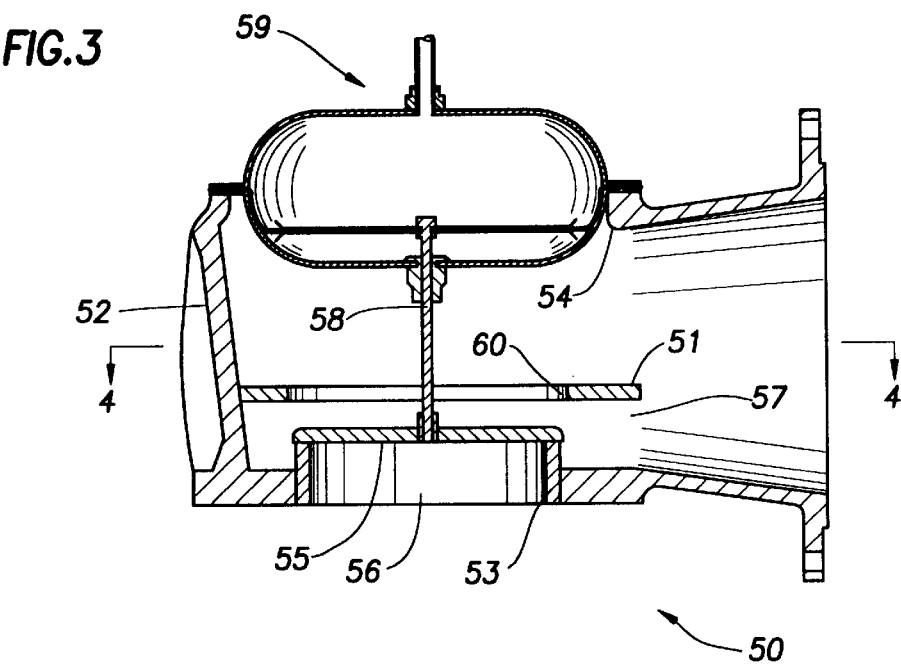
FIG. 3 is a right-angle closed body pressure relief valve equipped with the flow efficiency increasing features of the present invention.

A right-angle, forward flow, closed body valve of the present invention is indicated generally at 50 in FIG. 3. The valve 50 is a substantially conventional valve equipped with a baffle plate 51 of the present invention. When the valve 50 is opened, the baffle plate 51 improves the efficiency of fluid flow through the valve. The valve 50 includes a valve body 52 with an inlet nozzle 53 and an outlet nozzle 54. A circular valve plate or disc 55 is positioned in contact with a circular seat at the top of the inlet nozzle 53 to seal the pressure area 56 below the plate 55 from the pressure area 57 above the plate. The valve plate 55 is moved vertically by a valve stem 58 that in turn is actuated by a partially-illustrated conventional operator 59.

The baffle plate 51 is provided with a circular aperture 60 that is concentric with the baffle plate 55 and valve stem 58. The edges of the baffle plate 51 engage the internal wall of the valve cavity except for the frontal edge of the baffle that extends into the valve outlet region. The edges of the baffle preferably engage the internal valve cavity wall in a manner to substantially seal with the internal walls to restrict flow between the baffle and the walls. The baffle may also be cemented or welded or otherwise engaged with the valve body to stop all flow of fluid between the edges of the baffle and the internal surface of the valve. The aperture 60 has a diameter that is greater than the diameter of the valve plate 55. The valve plate 55 may be moved from its closed position illustrated in FIG. 3 to an open position by traveling upwards through the valve cavity and through the baffle aperture 60 into a position above the plane of the baffle 51.

With the valve in the position illustrated in FIG. 5, fluid in a low pressure area 61 flows through the inlet nozzle 53 and into a cavity area 62 contained within the body 52. The axial fluid flow entering through the nozzle 53 is partially directed against the base of the valve plate 55 where it is dispersed radially and in a circumferential direction around the valve stem axis 58. The turbulent flow induced by the initial entry of the fluid into the valve cavity is separated into an upper volumetric area indicated generally at 63, above the baffle plate 51 and a lower volumetric area indicated generally at 64 below the baffle plate. The baffle plate 51 is positioned such that the volume of the upper volumetric area 63 is greater than that of the lower volumetric area 64. Fluid leaving the areas 63 and 64 combines to exit the cavity 62 along the outlet flow constraint area 65 adjacent the downstream end of the areas 63 and 64.

In normal operation, the valve plate 55 moves, from a first "zero lift" position engaging the inlet nozzle seat (where flow into the body cavity is prevented) to a second, "maximum lift" position indicated in FIG. 5 (where maximum flow into the cavity is permitted). In some applications, the valve is designed to move only to the first and the second described positions corresponding to fully closed and fully opened positions. In other applications, the valve may be operated to position and hold the valve plate at variable distances from the closure position to effect a regulated flow from the high pressure area 61 into the exit area 65.

Figure 4:
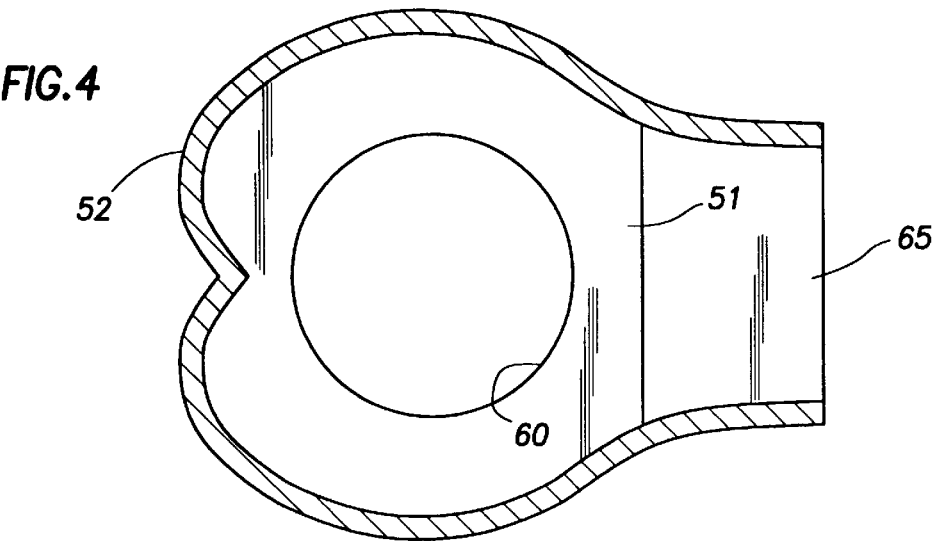
FIG. 4 is a horizontal cross section taken along the line 4—4 of FIG. 3, schematically illustrating the positioning and aperture of the baffle assembly of the present invention.
Figure 6:
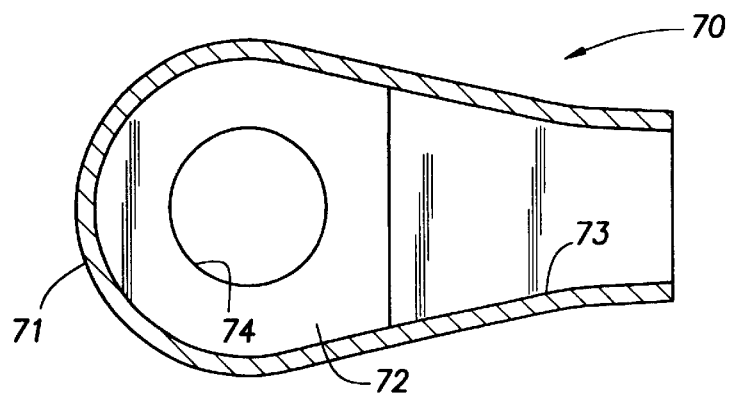
FIG. 6 is a horizontal, cross-sectional view illustrating a modified valve body employing the flow efficiency increasing structure of the present invention.

While the flow efficiency increasing invention has been described in a valve body with a specially contoured receiving cavity area 62 designed to increase the efficiency of flow through the valve, it may be appreciated that other forms of valve cavity may be employed with the present invention. FIG. 6 illustrates a modified form of valve body in which the specially contoured valve body walls have been replaced by a uniform configuration with a smaller cavity volume. The valve of FIG. 6, indicated generally at 70, is substantially similar to the valve illustrated with regard to FIGS. 3 and 4 except for the configuration of the valve body. The valve 70 includes a valve body 71 that has a horizontal cross-sectional shape with a semi-circular rear configuration uniformly tapering to a circular cross-sectional flow constraining conduit at its outlet 73. The vertical cross section of the valve body 71 at the outlet 73 is in the form of a tubular connector adapted to be secured to a correspondingly-shaped exit conduit. An aperture 74 in the baffle plate 72 is positioned and dimensioned relative to the valve stem and valve plate in the manner previously described with reference to FIGS. 3 and 4. As with the embodiments of FIGS. 3–5, except for the exit edge, the baffle plate 72 is sealed against the contacting walls of the body 71 to prevent flow between the baffle plate and the body at the point of contact.

FIG. 7 schematically illustrates a modified form of the invention functioning in a flow conductor indicated generally at 80. The flow conductor 80 conducts fluid flow from an upstream supply conduit 82 to a second downstream conduit 83. The configuration of FIG. 7 may be seen, for example, in a manifold or other arrangement where fluids are being transferred from one flow constraining structure to another with a change in fluid flow direction required at the intersection as the fluid traverses structures.

The connector of FIG. 7 employs a baffle plate 84 equipped with a central aperture 85. The baffle extends to an end section 86. The flow conductors 82 and 83 are circular in radial cross section and the aperture 85 is also circular.

The diameter of the circular aperture 85 is larger than the internal diameter of the flow conduit 82.

In a manner analogous to that described with reference to previous embodiments of the invention, fluid entering the downstream flow constraining conduit 83 from the upstream source conduit 82 is moved into turbulent flow as it strikes the internal surfaces of the conduit 83 and end area 86. The baffle 84 is configured and positioned to separate the induced turbulent flow areas into two distinct pressure and flow areas that are prevented from interacting in a manner that would increase the resistance to flow into the conduit 83. Fluid leaving the area above and below the plate 84 combines in the downstream area 87 with a more uniform pressure and velocity distribution across the radial cross-sectional area of the conduit so that the flow efficiency through the intersection of the conduits 82 and 83 is increased as compared with the efficiency of the flow that would occur without the baffle 84.

In the manner corresponding to that previously described with reference to other embodiments of the invention, the baffle 84 is sealed at its contact edges with the internal wall of the conduit 83 and at its engagement with the rear wall 86. It may be appreciated that the baffle plate 84 is essentially rectangular in its outer extremities to conform with the contacting internal walls of the flow conduit 83. The plane of the baffle plate 84 as well as the position, size and shape of the plate and/or the aperture 85 may be varied as required to obtain the optimum efficiency of flow through the intersection of the two constraining flow structures.

FIG. 8 of the drawings illustrates another modification of the invention indicated generally at 90 in which the flow from a tubular constraining member 91 is introduced into a second, larger tubular constraining member 92. A baffle plate 93 is positioned downstream of the point of intersection of the two conduits, within the conduit 92. A central circular aperture 94 through the plate 93 is located concentrically with the flow conduit 91. The edges of the rectangularly-shaped baffle plate 93 are sealed along their contacting lines with the surrounding internal wall of the conduit 92.

Flow entering the junction area of the conduits 91 and 92 strikes the opposing internal wall of the conduit 92 and the bottom of the baffle plate 93. A resulting turbulent flow is established in areas 95 and 96 above the baffle plate 93 and in the areas 97 and 98 below the baffle plate. The baffle plate prevents the turbulent flow in the areas above and below the baffle plate from interacting with each other until the flow enters an area 99 or 100 at either end of the baffle plate 93.

While the baffle plate 93 is illustrated in FIGS. 8 and 9 as being positioned approximately at the center of the flow conduit 92, it may be appreciated that the position of the baffle body relative to the opening from the conduit 91 into the conduit 92 and the dimensions and placement of the aperture 94 as well as the shape and length of the plate 93 may individually or collectively be modified as required to obtain the maximum efficiency of flow of fluids from the conduit 91 into the conduit 92.

Figure 10:
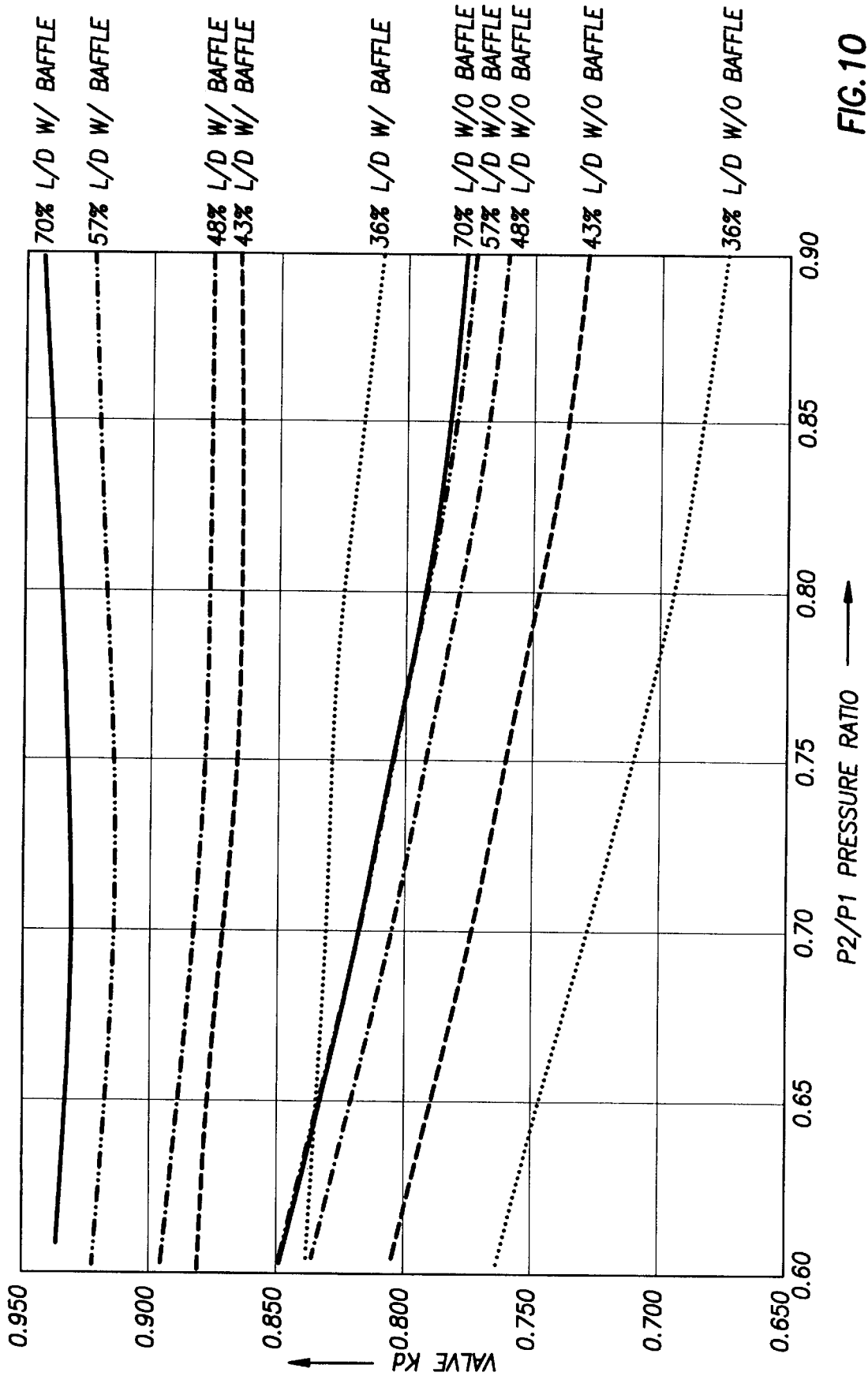
FIG. 10 is a graphical comparison of the flow efficiencies of valves with and without the baffle of the present invention in valves flowing vapors.
Figure 11:
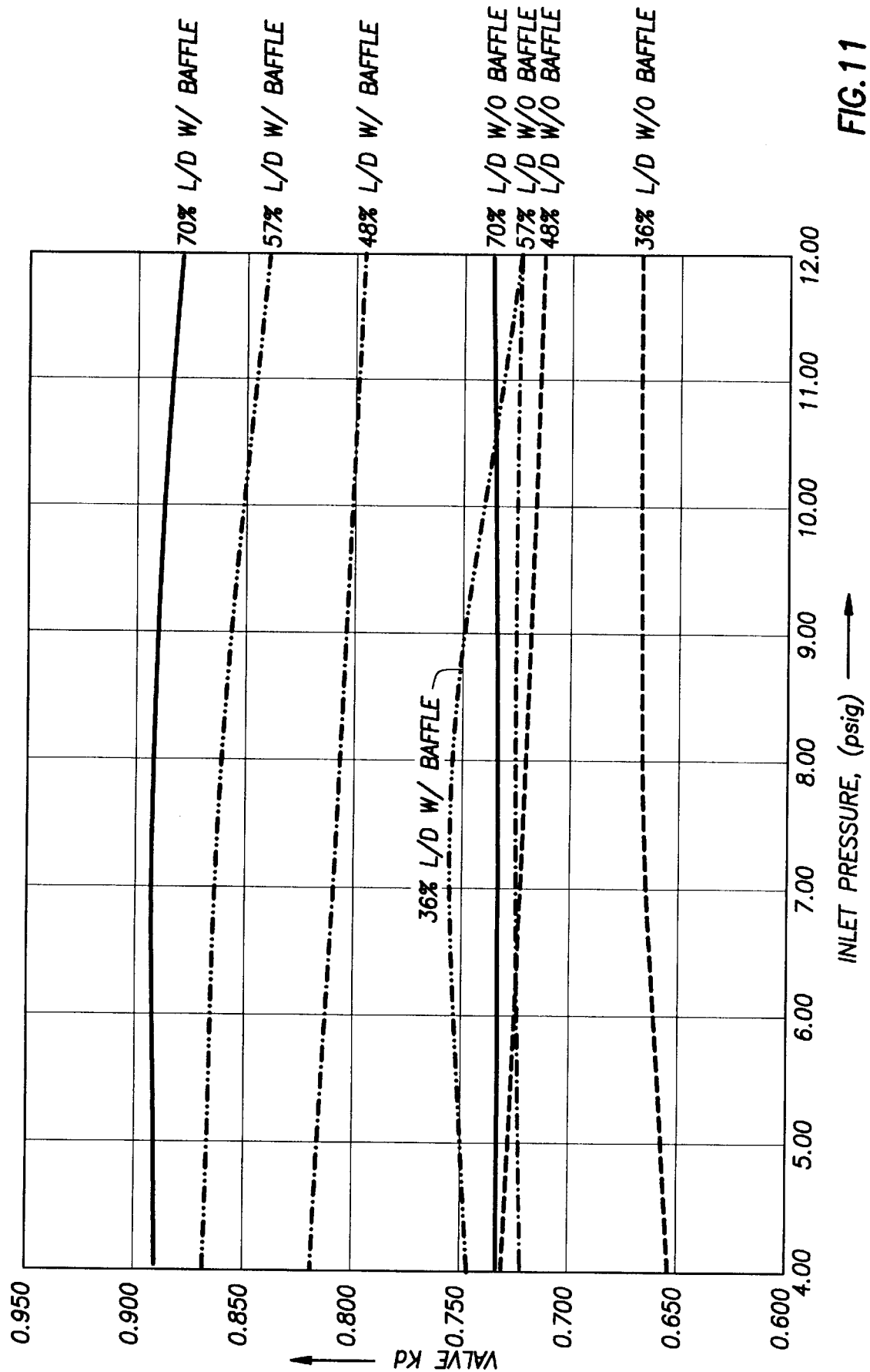
FIG. 11 is a graphical representation of the flow efficiencies of valves with and without the baffle of the present invention in valves flowing liquid.

FIGS. 10 and 11 illustrate the improvement in flow efficiencies realized with the use of the baffle of the present invention in a conventional valve design. FIG. 10 illustrates the valve discharge coefficient (Kd) for a valve of the type illustrated in FIGS. 5 and 6, both with and without the baffle portion of the present invention. The curves of FIG. 10 illustrate the Kd value versus the inlet to outlet pressure ratio (P2/P1) for five different ratios of lift to inlet nozzle bore diameter (L/D). The curves represent the valve operation with and without the baffle of the present invention in a valve flowing vapors. As may be seen with reference to FIG. 10, the values of the discharge coefficient (Kd) are substantially higher for valves equipped with the baffle of the present invention as compare with the same valve lacking such baffle. At an L/D of 70% with the baffle of the present invention in place, the Kd varies from approximately 0.940 to 0.949 as the inlet to outlet pressure ratio varies from 0.6 to 0.9 whereas the same valve with the same L/D operating without the baffle has a Kd value over the same range that varies from approximately 0.85 to approximately 0.77. Similar improvements exist for each of the L/D settings.

FIG. 11 illustrates the improvement of the valve operation indicated as a function of the inlet pressure alone for a valve flowing a liquid. As illustrated in FIG. 11, the Kd value for a valve operating with a 70% L/D and the baffle of the present invention varies from approximately 0.89 to 0.88 for an inlet pressure range of from 4 to 12 psig. The same valve without the baffle of the present invention, operating over the same range and for the same L/D, exhibits a Kd value of 0.735 to 0.745.

The benefits of the use of the baffle of the present invention in right angle valves may be optiized by variation in the following three parameters according to the method of the present invention: the height of the baffle above the nozzle as a percentage of the total valve lift height; the height of the baffle above the bottom of the valve outlet as a percentage of the total outlet height; and the baffle aperture diameter relative to the inlet nozzle bore. In a preferred embodiment of the apparatus and the method of the present invention in a right angle valve, values of these three parameters are as follows:

1. The preferred ratio of baffle height above the inlet nozzle to the total valve lift is approximately 0.45. Reductions in flow capacity occur as this ratio is increased. Rapid reductions occur at ratios greater than 0.55 where the baffle may intrude into the lower portion of the high energy radial region causing significant loss in flow capacity. The key element in positioning the baffle is to locate it as near as possible to the lower boundary of the radial horizontal flow emitting from the base of the valve disc without allowing any of that radial flow under the baffle. This placement of the baffle allows a maximum physical separation or "curtain area" for the lower flow region gas expansion without permitting that controlled expansion to be disturbed by the upper region high energy radial flow.

2. With a preferred 0.45 baffle height to total lift height ratio, the corresponding preferred ratio of the baffle aperture diameter to the valve inlet nozzle diameter is in the range from 1.25 to 1.50. The key element in establishing the diameter ratio is determined by the shape of the bottom boundary of the expanding upper region radial flow. The inner boundary of the baffle must be large enough so that when positioned at the preferred 0.45 baffle height/lift position, the baffle boundary edge does not extend into this expanding radial flow boundary which would direct undesirable radial velocity flow to the underside of the baffle.

3. The preferred ratio of valve discharge volume in the downstream region adjacent and below the baffle to total valve discharge volume is in the range from 0.30 to 0.40 regardless of the valve lift selected. A key element in the positioning of the baffle height above the outlet bottom relative to the total outlet height is to match the flow proportions in the flow areas above and below the baffle as closely as possible. The proportions of the flow volumes above and below the baffle should be matched as closely as possible to the corresponding percentages of total valve flow emanating from the upper nozzle high energy radial flow region discharging into the upper valve body region and the lower nozzle region low energy flow discharging into the lower valve body region below the baffle.

While the preferred embodiment of the invention has been described with specific reference to a flat baffle plate in a right angle valve, it may be appreciated that the invention may be employed to improved flow through other flow constraining devices. In such applications, the baffle configuration and placement are selected to provide separation of conflicting flows through the constraining structure such that the combined flow exiting the baffle is uniformly distributed in pressure and velocity over the entire outlet volume.

It should be understood that while the present invention is capable of improving the flow capacity in a right-angle valve body, its installation does not preclude potential additional capacity improvement from incorporation of valve body cavity shaping to improve the controlled expansion and flow of fluid in the body regions both above and below an installed baffle plate.

In general, it may be appreciated that the method of the present invention as applied to the different illustrated embodiments comprises the step of physically separating the turbulent flow regions or areas induced where fluid is transferred from one flow constraining structure to another. The method is specifically pertinent to those applications where a change in flow direction occurs in the transfer. In the method of the present invention, turbulent flow in the transfer area is physically separated to prevent the pressure and flow forces from combining to reinforce and restrict the entry and passage of flow from one flow constraining structure to the other. The method of the invention provides for physically separating adjacent flow regions in the combining structure such that adjacent turbulent flows are prevented from combining and reinforcing the opposition to flow past the area of turbulence with a redistribution of the pressure across the cross-sectional area of the outlet from the combining structure being more uniform to enhance the natural transfer of the fluids from the point of inlet to the point of outlet of the flow constraining structure.

The foregoing apparatus and method have been described with reference to the specific illustrated and described embodiments, however, it will be appreciated that such apparatus and method may be changed without departing from the spirit and scope of the present invention which is more fully defined in the following claims.

What is claimed is:

1. A method of increasing the efficiency of fluid flow through a right angle valve, said valve having an inlet nozzle, an outlet nozzle and a valve plate having a base, said valve plate being moveable from a first position with said base in engagement with said inlet nozzle where flow through said valve is prevented to a second position away from said inlet nozzle where flow through said valve is permitted, the distance between said first and second positions being the lift distance of said valve, comprising the step of placing a baffle in said valve between said inlet and said outlet nozzles at a third point spaced from the lower boundary of a radial horizontal flow of fluid emitting from the base of said valve disc whereby said radial horizontal flow is prevented from entering the area between said baffle and said inlet nozzle.

2. A method as defined in claim 1 wherein said third point is spaced from said inlet nozzle at a distance approximately equal to 45% of said lift distance.

3. A method as defined in claim 2 further comprising the step of providing said baffle with an aperture having a cross-sectional diameter that is approximately 125% to 150% of the cross-sectional diameter of said inlet nozzle.

4. A method as defined in claim 2 further comprising the step of arranging said baffle such that the ratio of valve discharge volume in said valve in the downstream region adjacent and below said baffle to the total downstream discharge volume adjacent said baffle is approximately 0.30 to 0.40.

5. A method of increasing the efficiency of fluid flow through an intersection of an upstream and a downstream flow conduit wherein the fluid changes flow direction at the intersection comprising the steps of separating the fluid in an area downstream of the intersection into first and second physical regions in which said fluid has differing pressure and/or flow characteristics whereby fluid in said first and second regions is prevented from combining in the area of said regions to produce flow and/or pressure characteristics opposing the flow of fluid from said intersection to a third region of said intersection farther downstream from said first and second regions;

placing a baffle plate in said downstream conduit for separating said first and second regions;

placing said baffle plate such that the direction of fluid flow from said upstream conduit is at substantially a right angle to a planar surface on said baffle plate; and providing an aperture in said baffle plate, substantially concentrically with the fluid flow from said upstream conduit.

6. A method as defined in claim 5 further comprising placing a valve seat about said upstream conduit intermediate said intersection and said baffle plate and placing a moveable valve plate within said intersection for movement relative to said valve seat for regulating flow from said upstream conduit into said downstream conduit.

7. A method as defined in claim 6 further comprising providing said valve plate with a smaller cross-sectional area then the cross-sectional area of said aperture for moving said valve plate from said valve seat to a point where said baffle plate is intermediate said valve plate and said valve seat.

8. A method as defined in claim 5 wherein said downstream conduit includes areas where said baffle is coincident with downstream flow of fluid from said intersection and said baffle plate is substantially sealed to internal walls of said downstream conduit except in the areas where said baffle is coincident with the downstream flow of fluid from said intersection.

9. An apparatus for increasing the flow efficiency of a fluid through a flow constraining structure in which the direction of flow of the fluid is required to change between an inlet to the interior of the structure and an outlet from the interior of the structure, comprising:

a baffle within the interior of said structure for separating said interior into first and second physically distinct volumetric areas wherein the flow of fluid in said first volumetric area is partially isolated from the flow of fluid in said second volumetric area, said baffle being disposed between said inlet and said outlet and comprising a substantially planar body having a plane substantially parallel to the direction of fluid flow exiting said outlet; and an aperture in said baffle whereby a portion of the fluid flowing from said inlet flows through said aperture before flowing to said outlet.

10. An apparatus as defined in claim 9 wherein said baffle aperture is substantially concentric with the center of flow of said fluid entering said inlet.

11. An apparatus as defined in claim 10 wherein the plane of said planar body of said baffle is substantially at a right angle to the direction of fluid flow entering said inlet.

12. An apparatus as defined in claim 9 wherein said baffle aperture has a larger lateral cross-sectional area than the lateral cross-sectional area of said inlet.

13. An apparatus as defined in claim 12 wherein said first volumetric area has a greater volume than said second volumetric area.

14. An apparatus as defined in claim 13 wherein said second volumetric area is between said baffle and said inlet.

15. An apparatus as defined in claim 14 wherein said inlet and said baffle aperture are substantially circular in lateral cross-section.

16. An apparatus for increasing the flow efficiency of a fluid through a flow constraining structure in which the direction of flow of the fluid is required to change between an inlet to the interior of the structure and an outlet from the interior of the structure, comprising:

a baffle within the interior of said structure for separating said interior into first and second physically distinct volumetric areas wherein the flow of fluid in said first volumetric area is partially isolated from the flow of fluid in said second volumetric area, said baffle being disposed between said inlet and said outlet and said inlet and said outlet having substantially right angle flow axes; and an aperture in said baffle whereby a portion of the fluid flowing from said inlet flows through said aperture before flowing to said outlet.

17. An apparatus for increasing the flow efficiency of a fluid through a flow constraining structure in which the direction of flow of the fluid is required to change between an inlet to the interior of the structure and an outlet from the interior of the structure, comprising:

a baffle within the interior of said structure for separating said interior into first and second physically distinct volumetric areas wherein the flow of fluid in said first volumetric area is partially isolated from the flow of fluid in said second volumetric area said baffle being disposed between said inlet and said outlet;

an aperture in said baffle whereby a portion of the fluid flowing from said inlet flows through said aperture before flowing to said outlet; and wherein said baffle and aperture are positioned and configured to produce a ratio of the discharge volume adjacent the downstream area between said baffle and said inlet to the total discharge volume adjacent said baffle of approximately 0.030 to 0.040.

18. An apparatus for increasing the flow efficiency of a fluid through a flow constraining structure in which the direction of flow of the fluid is required to change between an inlet to the interior of the structure and an outlet from the interior of the structure, comprising:

a baffle within the interior of said structure for separating said interior into first and second physically distinct volumetric areas wherein the flow of fluid in said first volumetric area is partially isolated from the flow of fluid in said second volumetric area, said baffle being disposed between said inlet and said outlet;

an aperture in said baffle whereby a portion of the fluid flowing from said inlet flows through said aperture before flowing to said outlet;

an inlet nozzle surrounding said inlet; and a ratio of baffle aperture diameter to said inlet nozzle diameter of approximately 1.25 to 1.50.

19. An apparatus for increasing the flow efficiency of a fluid through a flow constraining structure in which the direction of flow of the fluid is required to change between an inlet to the interior of the structure and an outlet from the interior of the structure, comprising:

a baffle within the interior of said structure for separating said interior into first and second physically distinct volumetric areas wherein the flow of fluid in said first volumetric area is partially isolated from the flow of fluid in said second volumetric area, said baffle being disposed between said inlet and said outlet; and wherein said structure includes interior walls and said baffle seals against a portion of the interior walls of said structure.

20. An apparatus for increasing the flow efficiency of a fluid through a flow constraining structure in which the direction of flow of the fluid is required to change between an inlet to the interior of the structure and an outlet from the interior of the structure, comprising:

a baffle within the interior of said structure for separating said interior into first and second physically distinct volumetric areas wherein the flow of fluid in said first volumetric area is partially isolated from the flow of fluid in said second volumetric area, said baffle being disposed between said inlet and said outlet;

an aperture in said baffle whereby a portion of the fluid flowing from said inlet flows through said aperture before flowing to said outlet; and a valve plate for regulating the flow of fluid from said inlet, wherein said valve plate is movable through said baffle aperture to move between said first and second volumetric areas.

21. An apparatus as defined in claim 20 further comprising:

an inlet nozzle surrounding said inlet;

a point of maximum valve plate movement away from said nozzle corresponding to the total lift for said valve plate; and said baffle positioned at a distance away from said inlet nozzle equal to approximately 45% of said total lift.

22. An apparatus as defined in claim 21 further comprising a ratio of baffle aperture diameter to valve inlet nozzle diameter of approximately 1.25 to 1.50.

23. An apparatus as defined in claim 20 wherein said baffle and aperture are positioned and configured to produce a ratio of the discharge volume adjacent the downstream area between said baffle and said inlet to the total discharge volume adjacent said baffle of from 0.30 to 0.40.

24. An apparatus as defined in claim 22 wherein said baffle and aperture are positioned and configured to produce a ratio of the discharge volume adjacent the downstream area between said baffle and said inlet to the total discharge volume adjacent said baffle of approximately 0.30 to 0.40.

* * * * *

UNITED STATES PATENT AND TRADEMARK OFFICE
CERTIFICATE OF CORRECTION

PATENT NO. : 5,967,165
DATED : October 19, 1999
INVENTOR(S) : Jack B. Alberts

It is certified that error appears in the above-identified patent and that said Letters Patent is hereby corrected as shown below:

In column 10, line 42, after "baffle" insert --plate--.

In column 10, line 46, after "baffle" insert --plate--.

Signed and Sealed this

Nineteenth Day of December, 2000

Attest:

Q. TODD DICKINSON

Attesting Officer

Commissioner of Patents and Trademarks